Jan. 17, 1933.   R. V. MORSE   1,894,780
PNEUMATIC VALVE
Filed Nov. 16, 1931   2 Sheets-Sheet 1

INVENTOR
Robert V. Morse

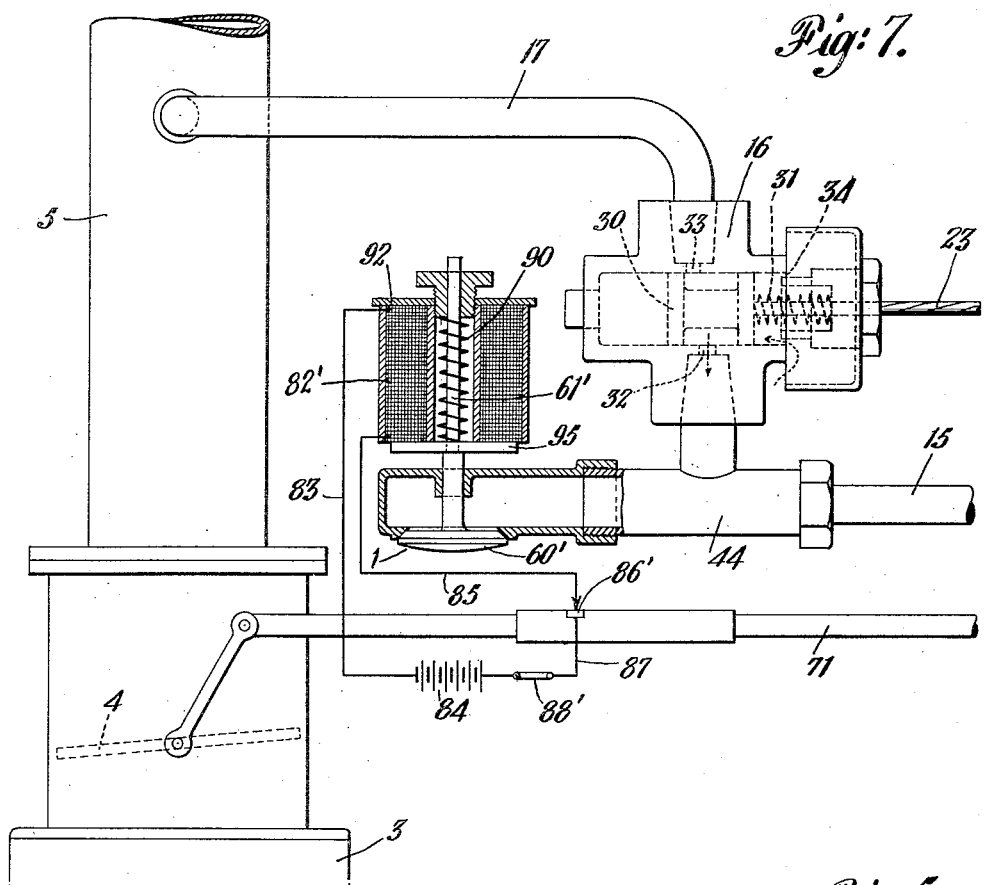
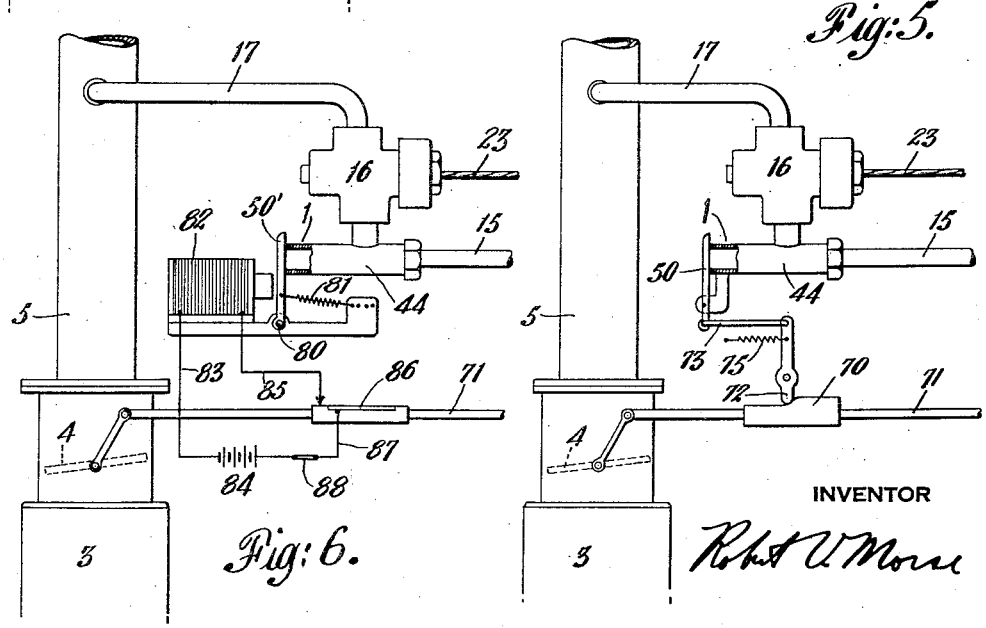

Patented Jan. 17, 1933

1,894,780

UNITED STATES PATENT OFFICE

ROBERT V. MORSE, OF NEW YORK, N. Y.

PNEUMATIC VALVE

Application filed November 16, 1931. Serial No. 575,393.

This invention relates to free-wheeling as applied to automobiles, for example, and particularly to free-wheeling devices of the vacuum operated type, or vacuum operated clutch controls, in which the clutch is operated by suction from the intake of the automobile engine. In general the operation of these devices is such that when the throttle is opened the vacuum or suction of the intake is reduced, allowing the clutch to engage, and when the throttle is closed,—as by lifting the foot off the accelerator pedal,—the suction in the intake is increased, and this through a suitable piston pulls out the clutch, thus disconnecting the engine from the wheels and automatically allowing free-wheeling.

These vacuum operated free-wheeling devices offer many advantages of simplicity and smooth engagement,—as the operation of pressing the accelerator pedal which allows the clutch to engage necessarily at the same time speeds up the engine to meet it,—so that the shocks possible in mechanical free-wheeling devices are avoided. However, I have discovered certain latent defects in the vacuum systems which under certain conditions may result in excessive wear on the clutch, and the primary objects of this invention are to overcome such defects, reduce the wear on the clutch, prevent the possibility of any action analogous to "riding the clutch", and prolong the life of the parts. Various other objects will become apparent as the description proceeds.

Referring now to the drawings:—

Figure 1 is a view of an automobile power plant, showing a typical form of free-wheeling apparatus of the vacuum type, to which the present invention is applied as an accessory or improvement, indicated in general by the reference numeral 1, and termed a pneumatic valve. This pneumatic valve 1 may be made in many different forms having the same general principle, and the remaining figures illustrate various examples, ranging from extremely simple mechanical forms to the more highly refined electrically controlled types.

Figure 5 shows a cam or trigger controlled trip for the pneumatic valve 1.

Figure 6 illustrates in diagrammatic form an electrically operated pneumatic valve 1.

Figure 7 shows, partly in cross-section, one of the more refined types of pneumatic valve 1, having a preferred form of electric control. This figure also illustrates the mechanism of a typical control valve of a well known type as used in vacuum operated free-wheeling devices.

Similar reference numerals refer to corresponding parts throughout the various views.

Figure 1:
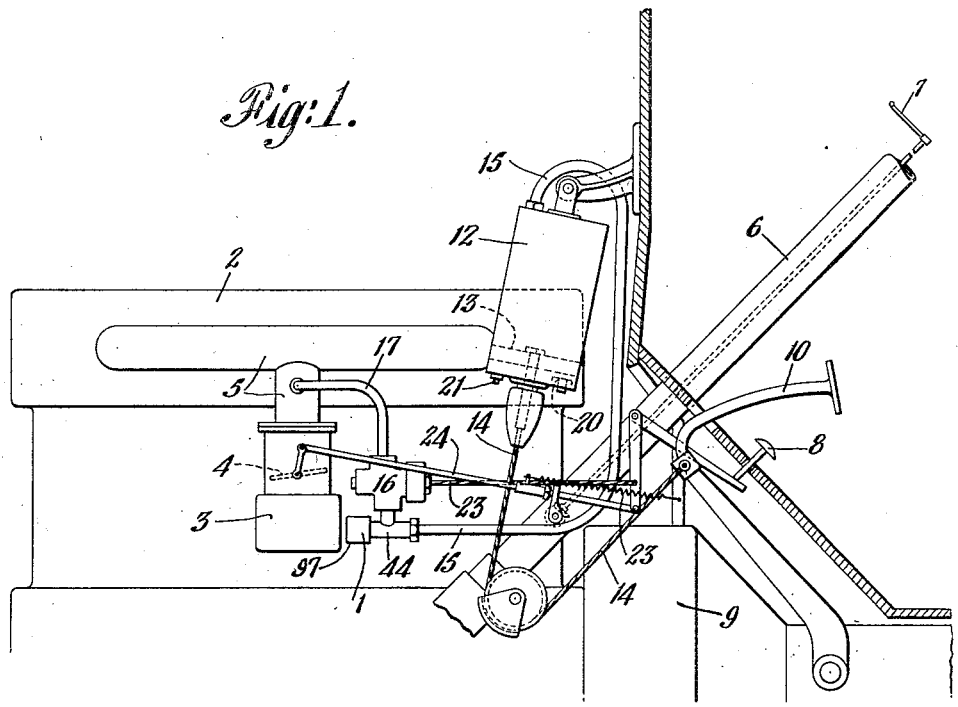

I will first briefly outline the general operation of a typical free-wheeling mechanism of the vacuum-controlled type. Referring now to the drawings, Figure 1 shows an automobile power plant having the usual motor 2, carburetor 3, throttle valve 4, intake manifold 5, steering wheel 6, hand throttle 7 on the steering wheel, foot throttle or accelerator 8 on the floor, clutch 9 and clutch pedal 10,—all as generally found in common practice. A vacuum operated free-wheeling attachment is shown in its usual or typical form, consisting of a vacuum cylinder 12 containing a piston 13 which is connected through a shaft, rod or cable 14 to the clutch pedal 10. A pipe 15 connects the cylinder 12 to the control valve 16, from which another pipe 17 leads to the intake manifold 5 of the motor, so that when the control valve 16 is open the suction or vacuum of the motor intake 5 will be communicated to the cylinder 12 and draw up the piston 13 so as to pull out the clutch pedal 10. In order to thus force or permit the piston 13 to move, air at atmospheric pressure is admitted below the piston through the automatic valve 20 whenever the piston 13 moves upward due to suction above. When through the operation of any of the controls the suction ceases the normal action of the clutch draws the piston 13 down and in order to give a gentle engagement the automatic valve 20 then closes, forcing the air cushion to escape through an adjustable relief valve or needle valve 21. This prevents any sudden or abrupt engagement of the clutch which might damage the car.

The control valve 16 is normally operated by a rod or cable 23 attached to the usual linkage 24 connecting the throttle 7 and accelerator 8 to the throttle valve 4 at the motor,—so that in general the control valve 16 is open when the throttle valve 4 is closed, and vice-versa. Thus when the engine is pulling and the throttle valve 4 is open, the suction at the intake 5 is ineffective and the clutch engages to drive the car, but when the throttle valve 4 is closed and the car coasting, the suction is strong and is connected through the valve 16 to operate the piston 13 in the cylinder 12 and disengage the clutch so that the car is free-wheeling. In general the action is automatic, by simply operating the accelerator pedal 8 in the usual manner. The free-wheeling can be thrown out of action at any time by merely opening the hand throttle 7 slightly so as to reduce the suction in the intake manifold.

The details of a typical control valve 16 of the ordinary type can be seen on a larger scale in Figure 7, in which the plunger valve 30 is connected to the cable 23 and operates against the spring 31. Below the plunger 30 a port 32 opens to the pipe 15 running to the main cylinder 12; above the plunger 30 and to the left a port 33 connects to the pipe 17 running to the intake 5 of the motor; while above and to the right a port 34 opens to the outside air. When the accelerator pedal 8 is pressed the cable 23 and valve 30 move to the left and connect the pipe 15 to the open air, permitting the clutch to engage. When the pressure on the accelerator pedal 8 is removed, allowing it to spring back in the usual manner, the cable 23 and valve 30 are moved to the right, connecting the pipe 15 to the pipe 17 so that the intake suction operates the cylinder 12 and disengages the clutch.

The foregoing is merely a typical example of vacuum apparatus well known in the art. I have discovered, however, that such apparatus, and any apparatus operating on the same general principles, is subject to a certain latent defect which under certain conditions may cause excessive wear in the clutch; and the principal object of the present invention is to improve such devices so as to overcome this difficulty. In any such apparatus where the clutch can be controlled by opening and closing the throttle,—that is, by varying differences of pressure,—it is possible to have the throttle so set that there is some suction on the piston 13 of the vacuum cylinder 12 for a considerable period of time, but not enough to promptly disengage the clutch. That is, there may be some tension on the clutch cable 14, but not enough to overcome the force of the clutch spring to actually disengage the clutch. If so, the effect is the same as "riding the clutch",—i. e., the habit of some drivers of keeping their foot on the clutch pedal while driving so that the force of the clutch engaging spring is partly neutralized. This means that the clutch must transmit its power with less than the proper pressure between the clutch plates, and this habit of riding the clutch is well known to be the common cause of rapid clutch wear, as it invites slipping which will ruin the average clutch in a comparatively short time.

To overcome this difficulty I provide apparatus which will automatically cause an instantaneous or discontinuous change in pressure in the vacuum system, as the pressure is varied up or down, so that the system cannot remain for any considerable time at an intermediate or partial pressure insufficient to actually operate it one way or the other. This insures that the system will either disengage the clutch promptly, or will not try to disengage it at all,—in other words, that there will be no riding of the clutch, regardless of where the throttle may be accidentally set.

In general the invention consists of an auxiliary valve in the vacuum line which will remain open up to a certain point and then snap closed and remain closed beyond that point, so that the suction will instantly jump to a considerably higher value when the valve closes and cannot be prolonged at any intermediate value. This auxiliary valve may be operated by the air flow itself, and/or by mechanical or electrical means.

Figure 2:
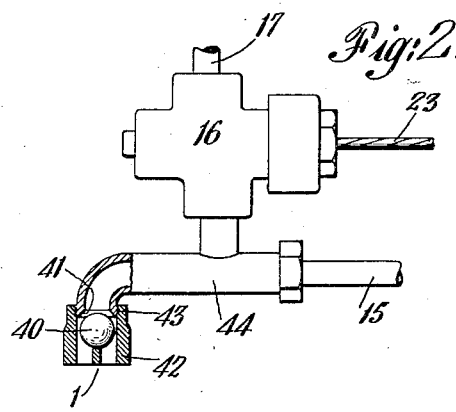
Figure 2 illustrates, partly in section, a very simple form of pneumatic valve 1, having a ball check valve.

Taking up the simplest forms first, Figure 2 shows a pneumatic valve 1 having a ball check valve 40 adapted to suck closed against the valve seat 41, and operating in a cage 42 which may be adjusted by screwing it on the threads 43 of the pipe 44, so as to regulate the clearance between the ball 40 and seat 41. The pneumatic valve 1 is shown connected to the pipe 15 by the pipe 44 in the form of a T, being one convenient method of mounting, but it will be understood that any of the pneumatic valves herein described may be as well connected to the tank 12, or anywhere in the suction line. In operation the weight and clearance of the ball 40 are adjusted so that with the full normal suction with the throttle closed the ball 40 will be sucked up against the seat 41 to close the valve, while if the suction is somewhat less the ball 40 will drop away and fully open the pneumatic valve, and substantially break the suction. This form of valve shown in Figure 2, while simple and cheap, is not so sensitive or susceptible to adjustment as some of the forms to be described, and is also liable to be shaken loose by jarring of the car.

Figure 3:
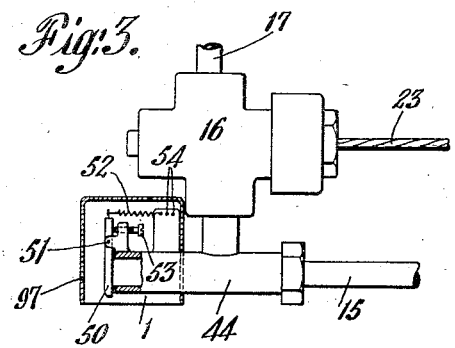
Figure 3 illustrates a somewhat more refined form of pneumatic valve 1, having a flutter valve with spring control and set-screw adjustment.

In the form shown in Figure 3, a flutter-valve 50 is hinged at 51 over the end of the pipe 44 which connects to the pipe 15. The valve 50 is normally held open by a spring 52, against an adjustable stop 53, by which the clearance or opening can be regulated. The tension of the spring 52 can also be adjusted, as indicated by the holes 54. The operation is similar to that described, in that the valve 50 will stay open for moderate or slight suction, and snap shut under heavy suction, thus creating a discontinuous change of pressure. In other words, the valve will stay open or closed, but not hang at an intermediate position.

Figure 4:
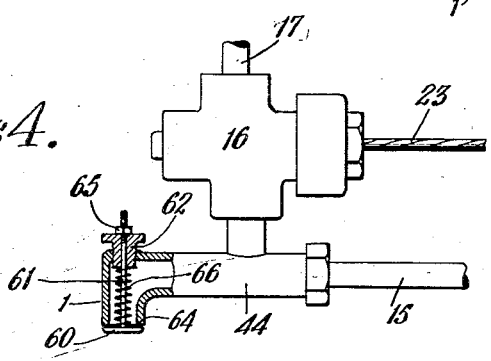
Figure 4 illustrates another modification of the pneumatic valve 1, having an adjustable poppet valve.

In the form shown in Figure 4, a poppet type valve 60 is used, with its stem 61 guided to travel through the adjustable bushing 62 screwed in the pipe 44. An adjusting nut 65 is screwed on to the upper end of the valve stem 61, by means of which the opening or clearance of the valve 60 on its seat 64 can be adjusted. A valve spring 66 normally holds the valve open, and the force of this spring can be adjusted by screwing the bushing 62 and nut 65. The operation is similar to that above described.

In Figure 5 the action of the valve 50 is supplemented by a cam or trigger controlled trip, consisting of a cam element 70 moved by the throttle control rod 71, and arranged so as to actuate a finger 72, which through a system of multiplying levers or linkages 73 opens or closes the valve 50. The system operates against the spring 75. Such a system, or any similar system having a cam or trigger control and a multiplying action, can give quick opening or closing at a definite throttle setting.

In Figure 6 an electrically operated valve is shown,—electricity being an excellent medium for giving a positive on-or-off action. The valve 50' is mounted over the end of the pipe 44 and is hinged at 80. A spring 81 normally holds the valve 50' closed,—its action being aided, of course, by any suction in the pipe 44. Opposed to the spring is an electro-magnet 82 which attracts the valve 50' when energized. The magnet 82 is connected by wire 83 to any suitable source of electrical energy 84 and by wire 85 to a movable contact 86 operated by the throttle control 71, through which the circuit is completed, by way of the wire 87 to the battery 84. A switch 88 is preferably inserted in the electrical circuit.

This electrical device operates as follows:— When the throttle is closed the contact at 86 is broken, opening the circuit and permitting the valve 50' to close. The automobile can then operate free-wheeling as described. When the throttle is opened slightly the circuit is completed through the contact 86, the magnet 82 is energized, opening the valve 50', and breaking the suction or vacuum in the system, so that the clutch is engaged to drive the car.

Another form of electrical pneumatic valve is shown in Figure 7. This uses a poppet type valve 60', and the valve is normally held open by the spring 90. The valve stem 61' extends through the core of the electro-magnet 82', which has an armored magnetic circuit or shell 92, except at the base where the magnetic circuit passes through the plate 95 of the valve 60'. This gives a strong, positive, magnetic action. The circuit of the electro-magnet includes the wire 83 to the battery 84 or other suitable source of electrical energy, and wire 85 to a movable contact 86' operated by the throttle control 71, together with wire 87 and switch 88'.

The operation is as follows: When the throttle is closed the electric circuit is completed at the contact 86' and the magnet is energized, thus attracting the poppet-valve 60' to its seat and closing the pipe 44, so that suction may be built up to operate the free-wheeling. When the throttle is opened slightly the contact at 86' is broken, opening the circuit, de-energizing the magnet 82', and permitting the spring 90 to open the valve and break the vacuum, so that the clutch will engage and drive the car. The operation described is in a sense the converse of that described in Figure 6,—in that in one case the spring opens the valve and in the other the spring closes it, but either type may be used, as will be obvious to those skilled in the art, and also a poppet-valve may be substituted for a hinged or flutter valve, or vice-versa. The type of valve,—whether poppet, hinged, flutter, piston or slide valve,—is immaterial, as will be obvious to those skilled in the art. In practice, in order to keep out dirt and rain, the valves are generally surrounded by a casing or cover 97, as shown in Figure 1 or Figure 3 for example, but omitted in the other figures for the sake of clearness.

Having described the general principles of the invention, and illustrated it in various forms, the general scope and application of the invention can now be considered. It will be noted that the method of jumping the pressure up or down so that it cannot drag through an intermediate zone of uncertainty is generally applicable to any automobile clutch or free-wheeling transmission device wherever it is actuated by the suction of a fluid, such as air, gas, or oil, which varies with the speed or power of the car.

While I have in the foregoing described certain specific examples, it will be understood that they are merely for purposes of illustration to make clear the principles of the invention, which is not limited to the particular form shown, and is susceptible to various modifications and adaptations in different installations, as will be apparent to those skilled in the art, without departing from the scope of the invention as stated in the following claims.

I claim:

1. In automotive apparatus, the combination of a free-wheeling mechanism of the vacuum operated type, an accelerator pedal, a main control valve for said vacuum mechanism operable by said accelerator pedal, and an auxiliary valve of the quick acting type connected into said vacuum mechanism whereby an abrupt change of vacuum pressure may be produced, however gradual the movements of the main control valve may be.

2. In automotive apparatus, the combination of a free-wheeling mechanism of the vacuum operated type, an accelerator pedal, a main control valve for said vacuum mechanism operable by said accelerator pedal, and and auxiliary valve of the quick acting type connected into said vacuum mechanism and arranged to accentuate changes of pressure in the vacuum system.

3. In automotive apparatus, the combination of a motor intake, a throttle valve connected to said intake and operable to fine gradations to produce smooth variations in the suction pressure in said intake, a free-wheeling control valve connected to said intake so as to be exposed to said variations in suction pressure, a vacuum operated free-wheeling device connected to said control valve, means for opening and closing said control valve so that the free-wheeling device may be operated by the suction in said intake, and a quick-acting auxiliary valve adapted to accentuate variations in pressure in the vacuum operating the free-wheeling device.

4. In automotive apparatus, the combination of a vacuum operated free-wheeling device, a variable source of suction pressure, a control valve between said source of suction and the vacuum operated device, an auxiliary valve also connected to said vacuum operated device, said auxiliary valve being normally open to the atmosphere when the suction is slight, so as to substantially break the vacuum, and arranged to snap shut when there is greater suction, to produce a sudden change in the vacuum pressure.

5. In automotive apparatus, the combination of a motor intake, a throttle valve for said intake, an accelerator pedal for operating said throttle valve, a clutch, a vacuum operated mechanism for operating said clutch, a main control valve for said vacuum mechanism, said main control valve being operable by said accelerator pedal, connections from said valve to the intake and to the vacuum operated mechanism, whereby the suction of the intake may operate the mechanism through said valve, and an auxiliary valve also connected to the vacuum operated mechanism, said auxiliary valve being adapted to operate more quickly than the main valve and arranged to be open to the atmosphere so as to reduce light suctions and to suddenly close so as to increase heavier suctions, whereby the clutch may be positively operated.

In witness whereof I have hereunto set my hand this 14th day of November 1931.

ROBERT V. MORSE.